United States Patent
Patenaude et al.

(10) Patent No.: US 9,689,490 B2
(45) Date of Patent: Jun. 27, 2017

(54) METHOD OF OPTIMIZED GEAR SELECTION ON HIGH SPEED DIRECTIONAL SHIFTS

(71) Applicant: Caterpillar Inc., Peoria, IL (US)

(72) Inventors: Jaspen Tanner Patenaude, Princeville, IL (US); Matthew Donald Meads, East Peoria, IL (US); Kranthi Kumar Kothamachu, Peoria, IL (US); John Bernard Hessling, III, Marquette Heights, IL (US)

(73) Assignee: Caterpillar Inc., Peoria, IL (US)

(*) Notice: Subject to any disclaimer, the term of this patent is extended or adjusted under 35 U.S.C. 154(b) by 22 days.

(21) Appl. No.: 14/727,449

(22) Filed: Jun. 1, 2015

(65) Prior Publication Data

US 2016/0348785 A1 Dec. 1, 2016

(51) Int. Cl.
*F16H 61/02* (2006.01)
*F16H 59/40* (2006.01)
*F16H 59/66* (2006.01)
*F16H 59/02* (2006.01)
*F16H 59/72* (2006.01)
*F16H 37/04* (2006.01)
*F16H 59/52* (2006.01)

(52) U.S. Cl.
CPC ......... *F16H 61/0213* (2013.01); *F16H 59/66* (2013.01); *F16H 59/40* (2013.01); *F16H 59/52* (2013.01); *F16H 59/72* (2013.01); *F16H 2037/049* (2013.01); *F16H 2059/0256* (2013.01); *F16H 2059/663* (2013.01); *F16H 2061/022* (2013.01); *F16H 2061/0216* (2013.01)

(58) Field of Classification Search
CPC .......... F16H 59/40; F16H 59/72; F16H 59/52; F16H 59/55; F16H 2059/0256; F16H 2059/663; F16H 61/0213; F16H 2061/0218; F16H 2061/022; F16H 2037/049; F16H 59/66
See application file for complete search history.

(56) References Cited

U.S. PATENT DOCUMENTS

| | | | | |
|---|---|---|---|---|
| 4,989,470 A | * | 2/1991 | Bulgrien | ............... B60W 10/02 477/119 |
| 5,036,718 A | | 8/1991 | Bulgrien | |
| 5,353,662 A | | 10/1994 | Vaughters | |

(Continued)

*Primary Examiner* — Ramya Burgess
*Assistant Examiner* — David Morris
(74) *Attorney, Agent, or Firm* — Miller, Matthias & Hull

(57) ABSTRACT

Methods for machine velocity change gear selection and shift execution are disclosed. A current velocity and a maximum velocity change for a work machine from the current velocity may be determined. The maximum velocity change may be based on a maximum amount of energy expended to change the velocity of the work machine without exceeding an operational limit of a work machine component. A selected machine velocity change target gear may be a highest one of the available gears that will not cause a difference between the current velocity and an end of shift velocity of the work machine that is greater than the maximum velocity change so that the maximum amount of energy will not be exceeded. Factors affecting the maximum velocity change may include the grade, the mass of the work machine, and a transmission oil temperature.

20 Claims, 8 Drawing Sheets

(56) References Cited

U.S. PATENT DOCUMENTS

| | | | | |
|---|---|---|---|---|
| 5,406,862 | A | * | 4/1995 | Amsallen ................ F16H 59/52 |
| | | | | 477/900 |
| 6,026,699 | A | | 2/2000 | Heitz et al. |
| 7,220,215 | B2 | * | 5/2007 | Eriksson ............... B60W 10/06 |
| | | | | 477/107 |
| 2008/0214348 | A1 | * | 9/2008 | Hasegawa ............. F16H 37/043 |
| | | | | 475/80 |
| 2014/0206502 | A1 | | 7/2014 | Dix |

* cited by examiner

| Starting Gear when Directional Requested | Transmission Output Speed when Directional Requested | Shift Control Logic |
|---|---|---|
| 4F | < 825rpm | 4F-2R |
| | between 825rpm & 1575rpm | 4F-1R |
| | > 1575rpm | 4F-3F-1R |
| 3F | < 1125rpm | 3F-2R |
| | between 1125rpm & 2170rpm | 3F-1R |
| | > 2170rpm | No shift |
| 2F | < 1640rpm | 2F-2R |
| | > 1640rpm | 2F-1R |
| 1F | Any | 1F-1R |
| 4R | < 1153rpm | 4R-2F |
| | between 1153rpm & 1400rpm | 4R-1F |
| | between 1400rpm & 1788rpm | 4R-3R-2F |
| | > 1788rpm | 4R-3R-1F |
| 3R | < 1175rpm | 3R-3F |
| | between 1175rpm & 1788rpm | 3R-2F |
| | between 1788rpm & 2170rpm | 3R-1F |
| | > 2170rpm | No shift |
| 2R | Any | 2R-2F |
| 1R | Any | 1R-1F |

METHOD OF OPTIMIZED GEAR SELECTION ON HIGH SPEED DIRECTIONAL SHIFTS

TECHNICAL FIELD

The present disclosure relates generally to transmission control systems in work machines and, more particularly, to a method of optimizing gear selection on velocity changes and high speed directional shifts based on the energy required to accelerate, decelerate or reverse the direction of the work machine.

BACKGROUND

Work machines, mining equipment and other work vehicles may include a transmission coupled to a power source such as an internal combustion engine or an electric motor in order to provide more flexible use of the power output of the power source. The transmission may provide a number of gear ratios that enable the work machine to travel at a relatively wide range of speeds or conditions that might be impractical without a transmission. Some transmissions are configured to change gear ratios automatically in order to improve the ease of operation of the work machine as it is operated through its speed range.

The circumstances under which the transmission shifts gears may affect the efficiency of operation of the work machine. For example, the time at which the transmission shifts gears and the gears selected by the transmission may result in operating the power source at more efficient power source speeds and power outputs. For example, in general, it is more efficient to operate a power source at relatively lower power source speeds for a given power output. However, under certain conditions, it may be preferable to operate the power source in a range of power source speeds that result in relatively higher energy consumption at the expense of efficiency. If the machine is heavily loaded and/or travelling up a relatively steep or long grade, it may be preferable for the transmission to select gear ratios that provide improved performance even if efficiency may suffer.

In some work machine applications, it may be desirable for the transmission to provide directional shifting, or "shuttle shifting," capability that permits the operator to command a machine direction reversal, and with the transmission responding by causing the work machine to slow down and then change direction. The directional shifting functionality alleviates the need for the operator to press a brake and stop the machine, move the transmission shifter from forward or drive to reverse or vice versa, and depress the accelerator. Transmissions providing directional shifting functionality are known in the art. For example, U.S. Pat. No. 5,353,662, issued to Vaughters on Oct. 11, 1994, entitled "Transmission Shuttle Shift Deceleration Method," teaches a power shift transmission having a plurality of clutches, including a final or directional set of clutches. The clutches are controlled by electro-hydraulic direct acting valves and two electro-hydraulic proportional or pressure modulating valves. The pressure modulating valves modulate the pressure supplied to the direct acting valves associated with the three directional clutches. Vehicle deceleration during a shuttle shift is achieved by releasing or depressurizing all clutches, and then gradually pressurizing only two clutches in the final or directional set. The previously known transmissions performing directional shifting may only consider the speed of the vehicle and the current gear in determining the gear to engage in the reverse direction during a directional shift.

To perform a directional shift, an amount of energy is required to decelerate the machine in its current travel direction, and then accelerate the machine in the opposite direction. Similarly, energy is required to upshift, downshift or otherwise change the velocity of the machine. Much of the energy required for the change the machine's velocity is provided by the clutches within the transmission. As mentioned above, factors such as the loading on the machine and the grade up or down which the machine is traveling may be considered in the transmission control strategy to achieve a desired level of performance. These and other factors may also affect the amount of energy required to change velocity. For example, a loaded machine has more momentum than an unloaded machine, and consequently requires more energy to stop and then accelerate in the opposite direction. More energy is required to reverse the direction of a machine traveling downhill than the same machine traveling uphill. The increased energy requirement may cause increases in the heat generated at the transmission clutches during the velocity change, and can result in premature clutch failure when the clutch temperature repeatedly exceeds the material durability limits of the clutch components. However, such factors are not considered in previously known directional shift strategies. Similar issues can arise when the work machine accelerates and clutches cause the work machine to upshift and when the work machine decelerates and clutches maintain the current gear or downshift for engine braking. In view of this, opportunities exist for a gear selection strategy for upshifts, downshifts and high speed directional shifts that may prolong the useful life of the clutches and other components that can be subject to failure due to heat generated during the directional shifts.

SUMMARY OF THE DISCLOSURE

In one aspect of the present disclosure, a method for machine velocity change gear selection in a work machine is disclosed. The work machine may have a power source and a transmission having a plurality of first gears for causing the work machine to move in a first direction due to power from the power source, and a plurality of second gears for causing the work machine to move in a second direction opposite the first direction due to the power from the power source. The method may include determining a current velocity of the work machine moving in the first direction, and determining a maximum velocity change for the work machine from the current velocity, wherein the maximum velocity change is determined based on a maximum amount of energy that may be expended to change a velocity of the work machine without exceeding an operational limit of a component of the work machine. The method may further include selecting a machine velocity change target gear that is a highest one of the plurality of first and second gears that will not cause a difference between the current velocity of the work machine and an end of shift velocity of the work machine that is greater than the maximum velocity change.

In another aspect of the present disclosure, a work machine is disclosed. The work machine may include a power source having a power source output shaft, a transmission having a transmission input shaft operatively connected to the power source output shaft and a transmission output shaft, wherein the transmission may have a plurality of first gears for causing the work machine to move in a first direction due to power from the power source, and a plurality of second gears for causing the work machine to move in a second direction opposite the first direction due to the power from the power source. The work machine may further include a speed sensor operatively connected to one of the power source output shaft, the transmission input shaft and the transmission output shaft, with the speed sensor transmitting a speed sensor signal with a speed value, and a controller operatively connected to the speed sensor. The controller may be programmed to determine a current velocity of the work machine in the first direction based on the speed value of the speed sensor signal, and to determine a maximum velocity change for changing a velocity of the work machine from the current velocity, wherein the maximum velocity change is determined based on a maximum amount of energy that may be dissipated to change the velocity of the work machine without exceeding an operational limit of a component of the work machine. The controller may also be programmed to select a target gear that is a highest one of the plurality of first and second gears that will not cause a difference between the current velocity of the work machine and an end of shift velocity of the work machine that is greater than the maximum velocity change.

In a further aspect of the present disclosure, a method for directional shift gear selection in a work machine is disclosed. The work machine may have a power source and a transmission having a plurality of first gears for causing the work machine to move in a first direction due to power from the power source, and a plurality of second gears for causing the work machine to move in a second direction opposite the first direction due to the power from the power source. The method may include determining a current velocity of the work machine moving in the first direction, determining a percent grade of a work surface over which the work machine is moving the first direction, and determining a maximum velocity change for reversing movement of the work machine from the first direction to the second direction. The maximum velocity change may be determined based on a maximum amount of energy that may be expended to reverse the work machine from the first direction to the second direction without exceeding an operational limit of a component of the work machine, and the maximum velocity change decreases when the percent grade of the work surface causes the work machine to move downhill in the first direction and uphill in the second direction and the maximum velocity change increases when the percent grade of the work surface causes the work machine to move uphill in the first direction and downhill in the second direction. The method may further include selecting a directional shift target gear that is a highest one of the plurality of second gears that will not cause a difference between the current velocity in the first direction and an end of shift velocity in the second direction that is greater than the maximum velocity change.

Additional aspects are defined by the claims of this patent.

DETAILED DESCRIPTION

Figures 1, 2:
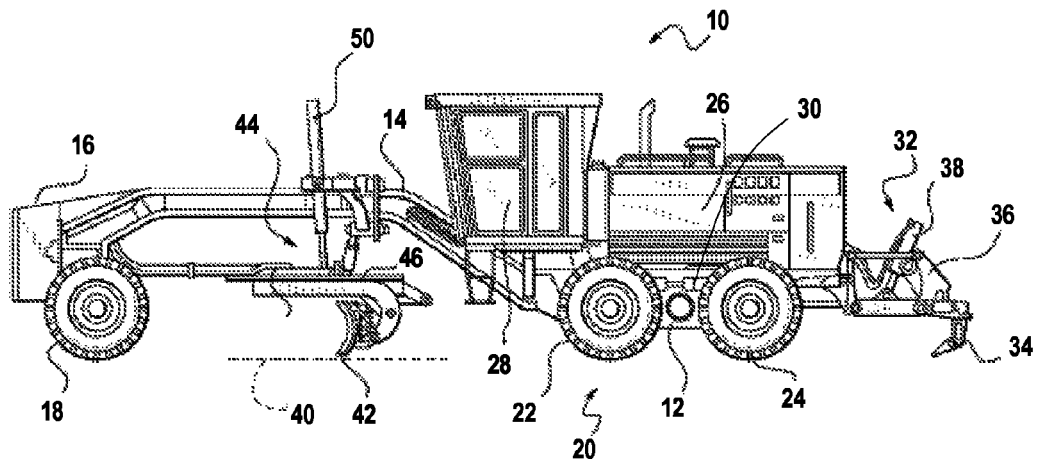
FIG. 1 is a side elevation view of an embodiment of a work machine in the form of a motor grader in which a shifting strategy in accordance with the present disclosure may be implemented.
FIG. 2 is a table of data for an exemplary directional shifting control logic that may be implemented in the work machine of FIG. 1.

The operation of a machine velocity change shift target gear selection strategy may be discussed with reference to an exemplary work machine in which the strategy may be implemented. FIG. 1 is a side view of a motor grader 10 that may include a chassis 12 from which forwardly extends a main frame 14. A forward end 16 of the main frame 14 may be supported by front wheels 18. The chassis 12 may be supported by a tandem drive 20 including a first set of rear wheels 22 and a second set of rear wheels 24. In alternative embodiments only a single set of rear wheel wheels may be provided. However, with a tandem drive system, all four rear wheels 22, 24 may be powered. The chassis 12 may support a power source 26, such as an internal combustion engine, and an operator cab 28 as one of ordinary skill in the art will readily understand.

Each of the wheels 22, 24 may be powered by an automatic transmission 30 operatively connected between the power source 26 and the wheels 22, 24. A rotating power source output shaft (not shown) extending from the power source 26 is connected to a transmission input shaft (not shown) directly, by a torque converter, or by another indirect connection known in the art. A transmission output shaft (not shown) is then connected to the wheels 22, 24 by way of a final drive (not shown) or the like. As is typical and known in the art, the transmission 30 may have a series of gears (not shown) that are selectively engaged by a combination of clutches (not shown) and brakes (not shown).

Rearward of the power source 26, a first implement 32, such as a ripper attachment, may be coupled to the motor grader 10. The ripper attachment 32 may include a plurality of downwardly directed tines or claws 34 extending from a frame 36, as well as a hydraulic cylinder 38 for raising and lowering the ripper attachment 32. When lowered, the tines 34 engage a work surface 40 such that when the motor grader 10 moves forward the work surface 40 is displaced. The ripper attachment 32 may be demountably coupled to the motor grader 10 by a coupling (not shown) that may allow the ripper attachment to be removed and/or replaced by a different implement, such as a larger ripper attachment, a smaller ripper attachment or scarifier, or other appropriate attachment that may change the weight and loading of the motor grader 10 in a manner that may change the energy required to perform a directional shift or change the velocity of the motor grader 10.

Downwardly depending from the main frame 14 may be a second implement 42 in the form of a work blade. The work blade 42 may be mounted on a drawbar-circle-moldboard (DCM) 44. The DCM 44 may include a drawbar 46 connected to a circle 48. The circle 48 may include a set of circular gear teeth (not shown) for allowing rotation of the work blade 42. Hydraulic cylinders 50 may also be provided to raise and lower the DCM 44 and blade 42 as a whole. In other embodiments, different mechanical or hydraulic arrangements can be provided to allow for rotation of the work blade 42, while in still other embodiments, specialized tools other than the work blade 42, or in addition to the work blade 42 may be mounted on the DCM 44 or otherwise under the main frame 14 or at the forward end 16. The varying arrangements of implements 42 attached to the main frame 14 may also affect the weight and loading of the motor grader 10 and the energy required to reverse the travel direction or change the velocity of the motor grader 10.

As discussed above, transmissions are known that provide directional shifting functionality that can change from a gear in one direction to a gear in the reverse direction in response to a command from the operator. The transmissions also upshift and downshift to increase and decrease, respectively, the speed of the motor grader 10 in the same direction. The determination of the target gear to which the transmission shifts is typically a function of the current gear in the initial direction of travel and the speed of the work machine 10 expressed as the transmission output shaft (TOS) velocity V at the time the upshift, downshift or directional shift is requested. FIG. 2 illustrates an exemplary table 60 for a known directional shifting strategy that may be implemented in the work machine 10 or other work machines. The table 60 includes a starting gear or from gear column 62, a TOS velocity column 64 and a shift control logic column 66. Turning to the fourth forward, or 4F, gear entries, the reverse gear to which the transmission 30 will shift decreases as the TOS velocity V increases. As a result, the transmission 30 can shift from 4F to 2R when the TOS velocity V is less than 825 rpm, and to 1R when the TOS velocity V is between 825 rpm and 1,575 rpm.

When the TOS velocity V is greater than 1,575 rpm, the transmission 30 cannot shift directly to a reverse gear due to the adverse effects on the components of the transmission 30 and other components of the work machine 10. Instead, the transmission 30 initially downshifts to 3F where the gear ratio will create a retarding force to slow the work machine 10 to a TOS velocity V that is less than 1,575 rpm, and then the directional shift is completed by shifting the transmission 30 to 1R. When the transmission 30 is in 3F or 3R, the shift control logic will not permit a directional shift until the operator slows the work machine 10 to a TOS velocity V below 2,170 rpm, and directional shifts from low gears 1F, 1R and 2R may be executed at any TOS velocity V.

Directional shifting strategies such as that shown in FIG. 2 are executed regardless of the real-time operating conditions of the work machine 10 except the TOS velocity V in the current gear. The strategies are derived using assumptions such as a constant grade over which the work machine 10 travels, a constant weight of the work machine 10 and a constant temperature of the oil within the transmission 30 at the time of the shift. However, variables such as these affect the energy required to execute upshifts, downshifts and directional shifts in positive and negative ways. In velocity and directional shifting strategies in accordance with the present disclosure, energy changes are factored into the general strategies such as that of FIG. 2 to dynamically adjust the shift control logic to protect and prolong the life of the transmission 30.

In one embodiment, as temperature is a key factor in degradation of the transmission clutches or other transmission components, a change in temperature of the clutches may be representative of the energy required to execute a velocity change and/or a directional shift having a TOS velocity change $\Delta V$ through the shift. An exemplary temperature formula is as follows:

$$T_{CLUTCH} = \tfrac{1}{2}mk\Delta V^2 + mkgt\sin(a\tan(G/100))\Delta V + k\text{bias} + T_O \quad (1)$$

Where $T_{CLUTCH}$ is the clutch temperature after the directional shift in ° C., m is the performance mass of the work machine 10 in kg, k is a constant derived from analysis for converting energy to temperature having units of ° C./kJ, g is the gravitational acceleration of 9.81 m/s² (32.19 ft/s²), t is the time to execute the velocity change or directional shift in seconds, G is the percent grade of the work surface 40, bias is the energy in the fuel burned during the directional shift in kJ, and $T_O$ is the bulk oil temperature or temperature of another relevant component in the transmission 30 at the beginning of the directional shift in ° C.

In Eq. (1), $\tfrac{1}{2}mk\Delta V^2$ is a kinematic energy term representing the energy required to make the TOS velocity change $\Delta V$ on the mass of the work machine 10. The term $mkgt\sin(a\tan(G/100))\Delta V$ is a potential energy term representing the energy input to travel up a grade during the time t or gained by traveling down the grade G. Consequently, the potential energy term will be positive when the work machine 10 transitions from traveling downhill to traveling uphill or increases speed traveled in forward or reverse uphill, and will be negative when the work machine 10 goes from moving uphill to moving downhill or increases speed traveled in forward or reverse downhill.

The clutch temperature $T_{CLUTCH}$ may serve as material durability target or limit that may be set to determine a maximum TOS velocity change $\Delta V$ during a velocity change or directional shift. For example, in one embodiment the glue used in the transmission clutches may begin to break down when the bulk oil temperature $T_O$ exceeds 200° C. (392° F.) and present the primary failure mode. Therefore, it is desirable to keep the energy required to execute a speed change or directional shift below that which will keep the clutch temperature $T_{CLUTCH}$ below 200° C. (392° F.). In the present example, this may be accomplished by solving Eq. (1) for the maximum TOS velocity change $\Delta V$ based on the current operating conditions. The effect of the parameters that may vary on the maximum TOS velocity change $\Delta V$ is apparent from Eq. (1). For example, an increase in the mass of the work machine 10 will increase at least the kinetic energy and the potential energy components unless the maximum TOS velocity change $\Delta V$ is decreased. Changes to the percent grade G will affect the potential energy component, and a higher initial bulk oil temperature $T_O$ toward the maximum clutch temperature $T_{CLUTCH}$ will dictate reductions in the kinetic and potential energy components to avoid overheating the transmission oil.

The temperature equation Eq. (1) can be converted to quadratic form:

$$0 = \tfrac{1}{2}mk\Delta V^2 + mkgt\sin(a\tan(G/100))\Delta V + k\text{bias} + T_O - T_{CLUTCH} \quad (2)$$

The quadratic equation Eq. (2) may be solved using the quadratic formula:

$$x = \frac{-b \pm \sqrt{b^2 - 4ac}}{2a} \quad (3)$$

where x is equal to the maximum TOS velocity change ΔV, a is equal to ½mk, b is equal to mktgsin(a tan(G/100)), and c is equal to kbias+$T_O$−$T_{CLUTCH}$.

In one implementation, the quadratic formula of Eq. (3) may be dynamically solved for the maximum TOS velocity change ΔV at the work machine 10 using measured values of the mass m, the percent grade G, and the oil temperature $T_O$. A load sensor may provide an indication of the mass m of the work machine 10 that can vary due to factors such as holding a load of material, the weight of the implements 32, 42 mounted thereto and the volume of fuel in a fuel reservoir of the work machine 10. A grade sensor may sense the pitch of the work machine 10 to indicate the grade, and a temperature sensor within the transmission housing or other drivetrain component may provide the current oil temperature $T_O$. With the sensed values, the maximum TOS velocity change ΔV may be calculated from Eq. (3).

The dynamic equation solution approach may yield a precise real-time value for the maximum TOS velocity change ΔV at any given time. However, the complexity of solving Eq. (3), which may be updated as the work machine 10 operates and the conditions change, can be resource intensive and provide greater precision than may be necessary. Consequently, to reduce the processing requirements, the values of the maximum TOS velocity change ΔV may be pre-calculated for various operating conditions and arranged in a table or tables or other database structures and stored in software at the work machine 10 where values for the maximum TOS velocity change ΔV can be retrieved when necessary.

In the most complex implementations, the tabular data may include values of the maximum TOS velocity change ΔV for all realistic combinations of the mass m, the percent grade G, and the oil temperature $T_O$. Fortunately, in many implementations, assumptions may be made about the operating conditions that can reduce the amount of stored information required for the expected operating conditions. For example, it can be assumed that the motor grader 10 of FIG. 1 has a constant mass m where the implements 32, 42 are permanently attached and no other implements can be attached. Moreover, the transmission oil may have a nominal operating temperature $T_O$ under normal conditions that can be expected at the time of most directional shifts.

Figure 3:
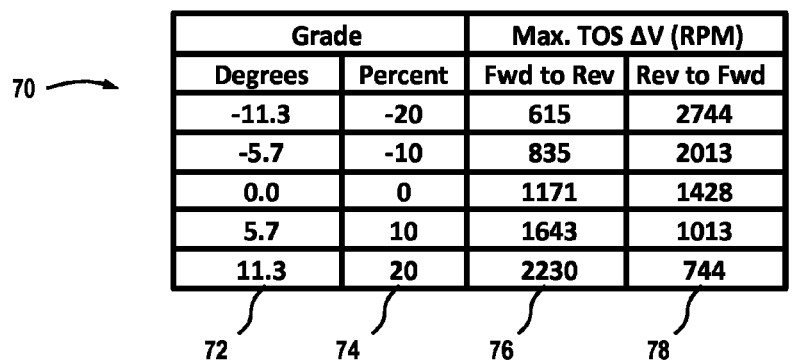
FIG. 3 is a table of data for directional shifting velocity change limits for values of grade of a work surface over which the work machine of FIG. 1 may travel.
Figure 4:
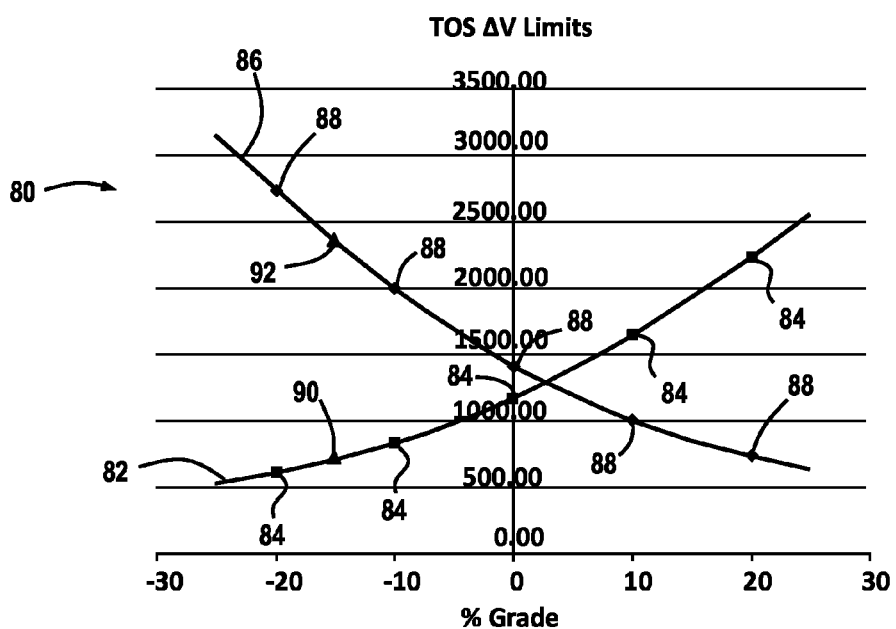
FIG. 4 is a graph of the data of the table of FIG. 4.

With the mass m and the oil temperature $T_O$ having assumed constant values, the percent grade G is the remaining variable, and the maximum TOS velocity change ΔV may be calculated and stored for various values of the percent grade G, and later uploaded to the work machine 10 and stored for later use. One example of a percent grade G versus maximum TOS velocity change ΔV table 70 is shown in FIG. 3. The table 70 may include a grade in degrees column 72, a percentage grade column 74, a forward-to-reverse maximum TOS velocity change ΔV column 76 and a reverse-to-forward maximum TOS velocity change ΔV column 78. The data of the table 70 is plotted in a graph 80 in FIG. 4 where a line 82 represents the forward-to-reverse data points 84, and a line 86 represents the reverse-to-forward data points 88. The lines 82, 86 show that more energy is required to reverse direction from traveling downhill to traveling uphill, and consequently the maximum TOS velocity change ΔV must be reduced to avoid exceeding the clutch limit temperature $T_{CLUTCH}$. A greater maximum TOS velocity change ΔV is permissible when reversing from uphill travel to downhill travel. The data of table 70 may also apply to downshifts without changing direction, and similar data may be generated for upshifts in the same direction.

As a work machine 10 operates in a work area, the current measured percent grade G may be used to perform a lookup in the table 70 to get a corresponding maximum TOS velocity change ΔV. If the percent grade G is found, the corresponding maximum TOS velocity change ΔV for the direction or speed change is extracted. While the Eqs. (1), (2) used to calculate the maximum TOS velocity change ΔV are non-linear, a close approximation of the maximum TOS velocity change ΔV may be obtained from the table data using linear interpolation. Consequently, a −15% grade may yield maximum TOS velocity change ΔV values of 725 RPM for forward-to-reverse shifts and 2,378 RPM for reverse-to-forward shifts as shown by the estimated data points 90, 92, respectively.

The strategy may be extended where the mass m of the work machine 10 may change. Where the change in mass m has a limited number of discrete values, such as where the mass changes are caused by changing, adding or removing implements 32, 42, the table 70 may be replicated for each discrete value of the mass m of the work machine 10. The mass m may be derived from a load or weight sensor, or the particular installed implements 32, 42 may be detected and their masses integrated into the mass m of the work machine 10, and a lookup may be performed on the appropriate version of the table 70. Where the mass m varies less discretely, such as in a dump truck that may carry a varying amount of material in its bed, the table 70 may be replicated for a series of masses m between the empty mass m of the work machine 10 and a fully loaded mass m. If the actual total mass m of the work machine 10 matches one of the tables 70, the maximum TOS velocity change ΔV can be derived as set forth above by directly reading the value or using linear interpolation. If the actual mass m is between the masses m of two tables 70, the maximum TOS velocity changes ΔV at the masses m of the tables 70 may be determined, and then a linear interpolation may be performed to calculate the estimated maximum TOS velocity change ΔV for the actual mass m. Similar enhancements to the maximum TOS velocity change ΔV calculation strategy may be implemented where the oil temperature $T_O$ is expected to vary as will be apparent to those skilled in the art.

Figure 5:
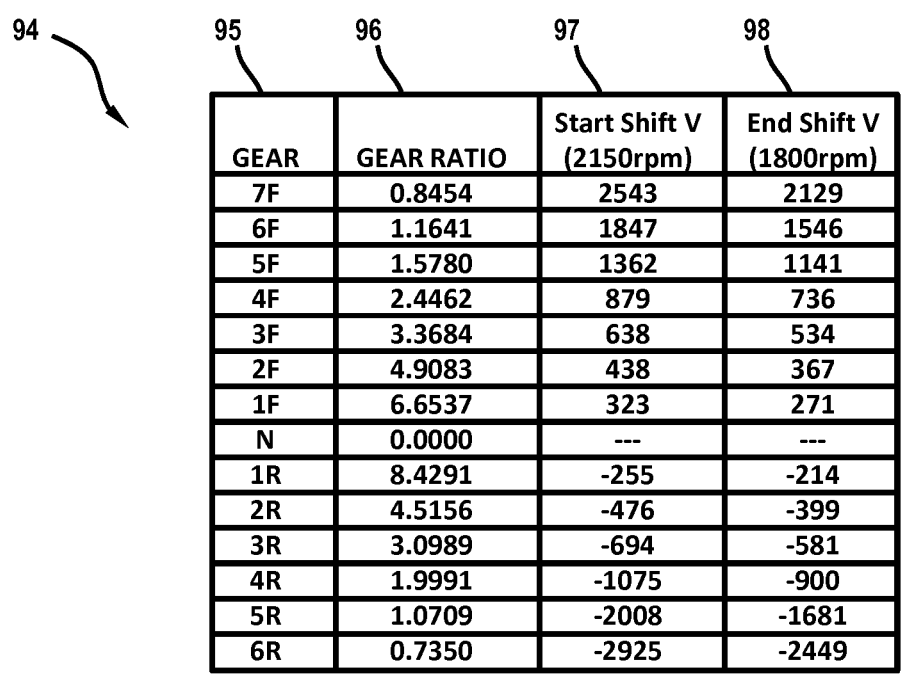
FIG. 5 is a table of data for an exemplary work machine transmission, including gear ratios, start of shift transmission output shaft velocities and end of shift transmission output shaft velocities.

The configuration of the transmission 30 will also be important in executing directional shifts, rolling neutral-to-gear shifts, upshifts and downshifts in routines discussed in detail below. FIG. 5 illustrates one exemplary configuration of the transmission 30 in a table 94. The table 94 includes a gear column 95, a gear ratio column 96, a TOS start shift velocity V column 97 and a TOS end shift velocity V column 98. The exemplary transmission 30 includes 7 forward gears 1F-7F with gear ratios ranging from 8.4291-1 to 0.7530-1, and 6 reverse gears 1R-6R with gear ratios ranging from 6.6537-1 to 0.8454-1 as indicated by the columns 95, 96. At points in the gear shift strategies detailed below, it may be desirable to estimate to TOS start shift velocity V at the start of a shift and the TOS end shift velocity V at the end of the shift in determining the appropriate target gear for the shift. The start of shift condition may assume an engine output speed (EOS) of the power source 26 of 2,150 rpm to yield the TOS start shift velocities V listed in column 97. For the end of shift condition, the work machine 10 may be configured to operate the power source 26 at a specified end of shift EOS. In the present embodiments, the end of shift EOS of the power source 26 may be 1,800 rpm to yield the TOS end shift velocities V listed in column 98.

As will be apparent from table 94, the sign convention for the TOS velocity V as used herein is positive values for the work machine 10 moving in the forward direction, and negative values for the work machine 10 moving in reverse. Similar conventions are used for the TOS velocity changes ΔV. Consequently, TOS velocity changes ΔV having positive values indicate increasing velocity in the forward direction, decreasing velocity in the reverse direction, or changing direction from reverse to forward, and TOS velocity changes ΔV having negative values indicate decreasing velocity in the forward direction, increasing velocity in the reverse direction, or changing direction from forward to reverse. These conventions will be discussed further as necessary hereinafter.

Figure 6:
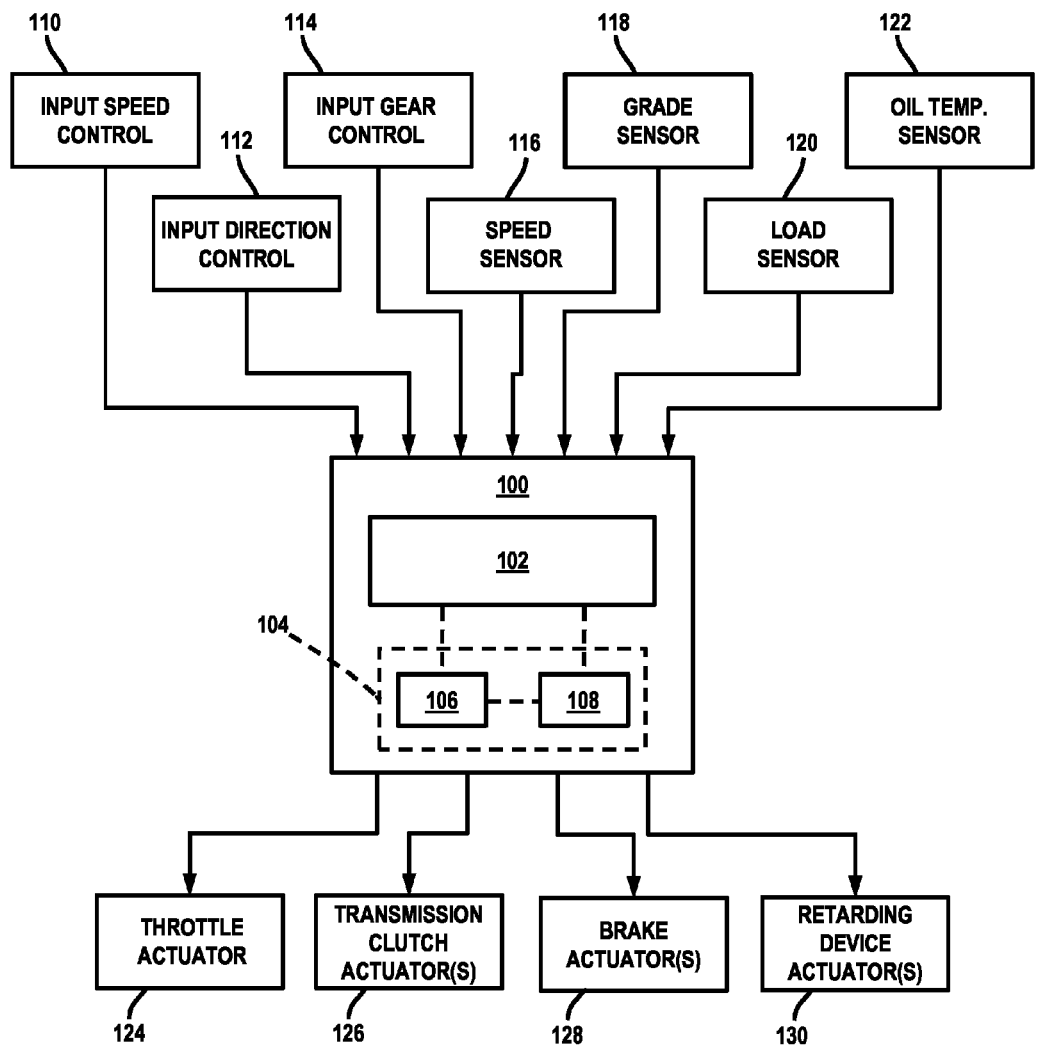
FIG. 6 is a schematic illustration of an exemplary electronic control unit and control components that may be implemented in the work vehicle of FIG. 1.

With the maximum TOS velocity change ΔV determined using the quadratic formula of Eq. (3) or the tables 70, an appropriate gear to which a speed change or directional shift may be executed can be determined. The work machine 10 may be provided with the necessary control components for determining the appropriate to gear and executing the shift. FIG. 6 illustrates one exemplary configuration of an electronic control unit or controller 100 that may be implemented in the work machine 10 to execute a velocity change shift strategies in accordance with the present disclosure, as well as other functions of the work machine 10. The controller 100 may include a microprocessor 102 for executing specified programs that control and monitor various functions associated with the work machine 10, including functions that are outside the scope of the present disclosure. The microprocessor 102 includes a memory 104, such as read only memory (ROM) 106, for storing a program or programs, and a random access memory (RAM) 108 which serves as a working memory area for use in executing the program(s) stored in the memory 104. Although the microprocessor 102 is shown, it is also possible and contemplated to use other electronic components such as a microcontroller, an ASIC (application specific integrated circuit) chip, or any other integrated circuit device.

The controller 100 electrically connects to the control elements of the work machine 10, as well as various input devices for commanding the operation of the work machine 10 and monitoring their performance. As a result, the controller 100 may be electrically connected to input devices detecting operator input and providing control signals to the controller 100 that may include an input speed control 110, such as a gas pedal or accelerator, that is manipulated by the operator to regulate the speed of the work machine 10 by transmitting a speed control signal, an input direction control 112, such as a gear shift or F-N-R selection switch, that produces a direction control signal indicating a direction of travel desired by the operator, an input gear control 114, such as a three-position toggle switch, allowing the operator to input a gear upshift and downshift command and producing a gear selection signal indicating an upshift or downshift from the present gear, and other controls necessary to control the operation of the work machine 10.

The controller 100 may also be connected to sensing devices providing sensor signals with values indicating real-time operating conditions of the work machine 10. The sensors may include an engine speed sensor 116 that may directly measure the TOS velocity V, or measure another value, such as the speed of the output shaft of the power source 26 or the transmission input shaft, that may be converted to the TOS velocity V based on other information such as the gear ratio for the current gear of the transmission 30. The engine speed sensor 116 may be a rotary speed sensor measuring the rotational speed of a corresponding shaft. The sensing devices may further include a grade sensor 118 that senses the pitch of the work machine 10 and outputs a grade sensor signal, a load sensor 120 that may sense a load on the power source 26, a weight of the work machine 10 or a load carried by the work machine 10, an identity of the implements 32, 42 attached to the work machine 10 or other parameters from which the performance mass m of the work machine 10 may be derived, and an oil temperature sensor 122, such as a thermocouple disposed within the transmission housing or other drivetrain component, that may transmit an oil temperature sensor signal a value corresponding to the oil temperature $T_O$.

The controller 100 may also be electrically connected to output devices to which control signals are transmitted and from which control signals may be received by the controller 100. The output devices may include an engine throttle 124 that may control the speed of the power source 26, a transmission clutch actuator or actuators 126 that may control the clutches of the transmission 30 to switch between the available gears, a brake actuator or actuators 128 that may cause hydraulic fluid to flow to braking devices to engage and reduce the speed of the work machine 10, and other retarding device actuators 130 that may be selectively operated to reduce the TOS velocity V.

Figure 7:
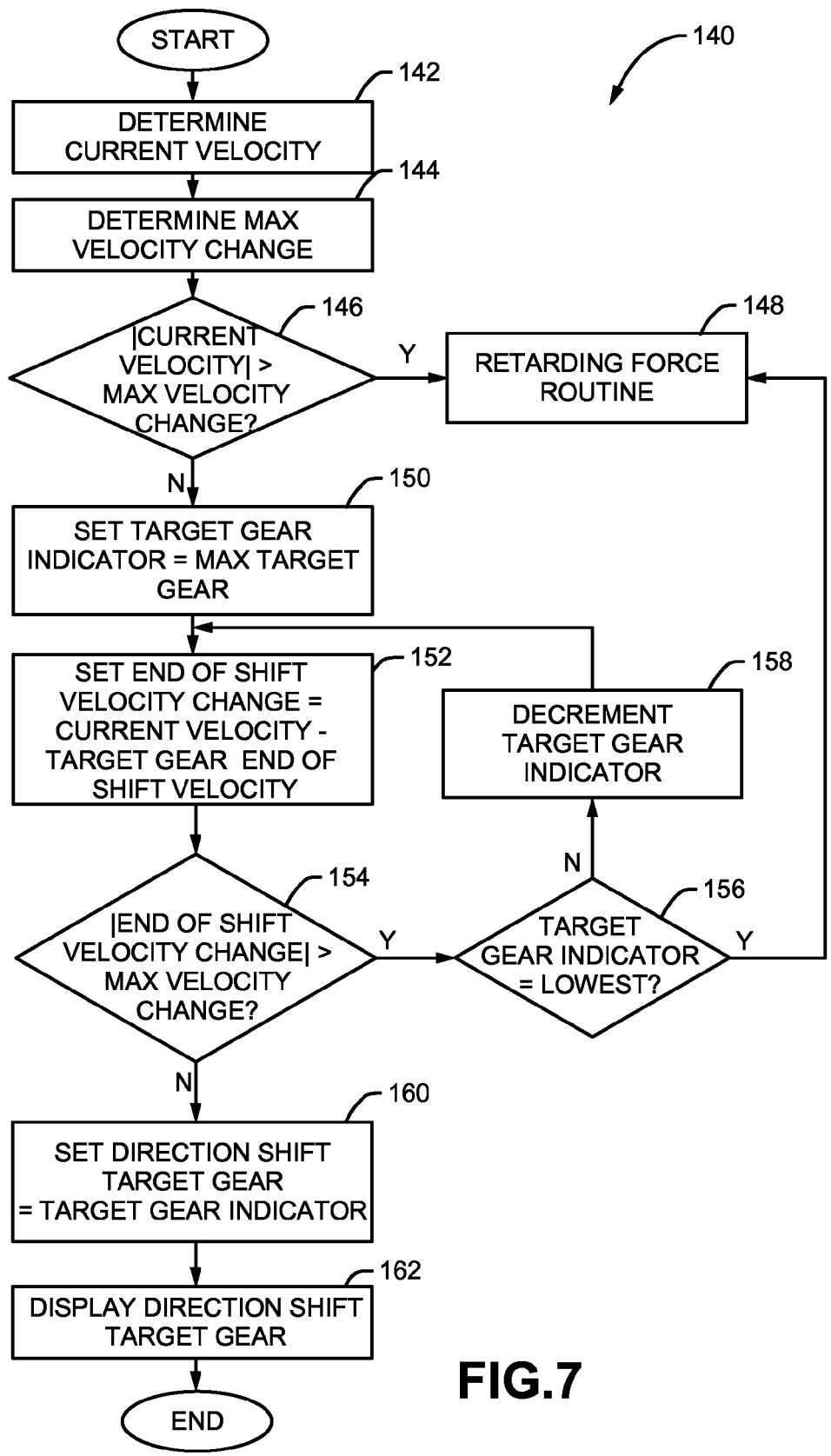
FIG. 7 is a flow diagram of an exemplary directional shift gear selection routine in accordance with the present disclosure that may be implemented in the work machine of FIG. 1.

With the configuration of the work machine 10 set forth above, the machine velocity change strategies for handling directional shifts, neutral-to-gear shifts, and upshifts and downshifts while limiting the energy required for the velocity changes are set forth hereinafter. In one embodiment of a machine velocity change strategy for directional shifts, the controller 100 may be programmed to execute a machine velocity change gear selection routine as the work machine 10 operates, and a machine velocity change shift execution routine in response to a velocity change request command input by the operator at the input direction control 112. FIG. 7 illustrates one embodiment of a machine velocity change gear selection routine 140. The routine 140 may execute continuously at every time step of the controller 100, such as every 20 msec, to continuously update the target gear to which the transmission 30 can shift without exceeding the maximum TOS velocity change ΔV. In alternative embodiments, the routine 140 may be execute each time the controller 100 detects a change in the speed sensor signals from the engine speed sensor 116 indicating a change in the engine speed, or each time a variable affecting the calculation of the maximum TOS velocity change ΔV in Eqs. (2) and (3), such as the mass m of the work machine 10, the percent grade G of the work surface 40 or the critical component temperature $T_O$. The routine 140 may begin at a block 142 where the controller 100 may determine the current TOS velocity V based on the information transmitted in the speed sensor signal. Based on the sign convention, the current TOS velocity V will be positive if the work machine 10 is driving forward and negative if it is driving in reverse. After the current TOS velocity V is determined, control may pass to a block 144 where the controller 100 may determine the maximum TOS velocity change ΔV for reversing the direction of the work machine 10 using a method such as those discussed above that is programmed into the controller 100 for the machine velocity change strategy. The method of calculation results in the maximum TOS velocity change ΔV being unsigned.

After calculating the current TOS velocity V at the block 142 and the maximum TOS velocity change ΔV at the block 144, control may pass to a block 146 to determine whether the work machine 10 is traveling too fast in the current direction to be able to make a directional shift from the current gear to any gear in the opposite direction. In this case, it may be necessary to slow the work machine 10 by applying a retarding force before shifting to a gear in the opposite direction. Consequently, the absolute value of the current TOS velocity V is compare to the maximum TOS velocity change ΔV at the block 146. If the absolute value of the current TOS velocity V is greater than the maximum TOS velocity change ΔV, the work machine 10 must be slowed, control may pass to a block 148 where the controller 100 may execute a retarding force routine that will determine a TOS velocity V to which the work machine 10 will be slowed by a retarding force and a subsequent target gear to which the transmission 30 will shift when a directional shift is requested as discussed further below.

If the absolute value of the current TOS velocity V is not greater than the maximum TOS velocity change ΔV at the block 146, it may be possible to execute a directional shift without first reducing the speed of the work machine 10. In this case, control may pass to a block 150 where a target gear indicator may be set to the maximum available gear in the target direction. In the exemplary transmission configuration of table 94, the maximum available gear for a directional shift from forward to reverse may be 6R. To determine an acceptable gear in the target direction, the controller 100 may identify the highest gear with a TOS end shift velocity V that will result in an end-of-shift TOS velocity change ΔV that is less than the maximum TOS speed change ΔV and the maximum energy input will not be reached or exceeded after the directional shift. As discussed above, the TOS end shift velocity V for a target gear may be determined based on a predetermined end of shift EOS that will be commanded by the controller 100, such as 1,800 rpm as used in the table 94.

Using the predetermined end of shift EOS, control may pass to a block 152 to set the end-of-shift TOS velocity change ΔV equal to the current TOS velocity V minus the TOS end shift velocity V for the target gear indicator from the table 94 or as calculated by the controller 100. With the end-of-shift TOS velocity change ΔV calculated, control may pass to a block 154 where the absolute value of the end-of-shift TOS velocity change ΔV is compared to the maximum TOS velocity change ΔV. The absolute value is used because the end-of-shift TOS velocity change ΔV is signed and the maximum TOS velocity change ΔV is unsigned. If the end-of-shift TOS velocity change ΔV is greater than the maximum TOS velocity change ΔV, a directional shift to the target gear could take the work machine 10 to a TOS end shift velocity V requiring energy that would increase the oil temperature $T_O$ above the clutch limit temperature $T_{CLUTCH}$ and place the transmission clutches at risk of degradation or failure. In this condition, it is necessary to continue evaluating the lower gears for meeting the requirements for completing the directional shift.

When the end-of-shift TOS velocity V is greater than the maximum TOS velocity change ΔV at the block 154, control may pass to a block 156 to determine whether there are lower gears to evaluate. If the target gear indicator is set to the lowest gear in the target direction, and all the possible target gears have been evaluated and a directional shift cannot be immediately executed to a gear in the target direction, control may pass from the block 156 to the block 148 to execute the retarding force routine and determine the TOS velocity V to which the work machine 10 will be slowed by a retarding force and the subsequent target gear to which the transmission 30 will shift when a directional shift is requested. If the target gear indicator is not set to the lowest gear in the target direction at the block 156, control may pass to a block 158 where the target gear indicator may be decremented to next lowest gear in the target direction, and then control may pass back to the block 152 for calculation and evaluation of the end-of-shift TOS velocity V for the next potential target gear.

When the absolute value of the end-of-shift TOS velocity change ΔV is less than the maximum TOS velocity change ΔV at the block 154, the amount of energy required for a directional shift to the target gear would not increase the oil temperature $T_O$ above the clutch limit temperature $T_{CLUTCH}$. The directional shift to the target gear could be executed without placing the transmission clutches at an elevated risk of degradation or failure. At this point, control may pass to a block 160 where a directional shift target gear indicator may be set equal to the target gear from the target gear indicator for use by the controller 100 in executing a directional shift when commanded. Control may then pass to a block 162 where the controller 100 may cause a display device (not shown) in the operator cab 28 to display the target gear to the operator for reference. Once the target gear is determined and displayed, the machine velocity change gear selection routine 140 may terminate until the next time step of the controller 100, or until the next change in the current TOS velocity V, mass m, percent grade G or critical component temperature $T_O$.

Figure 8:
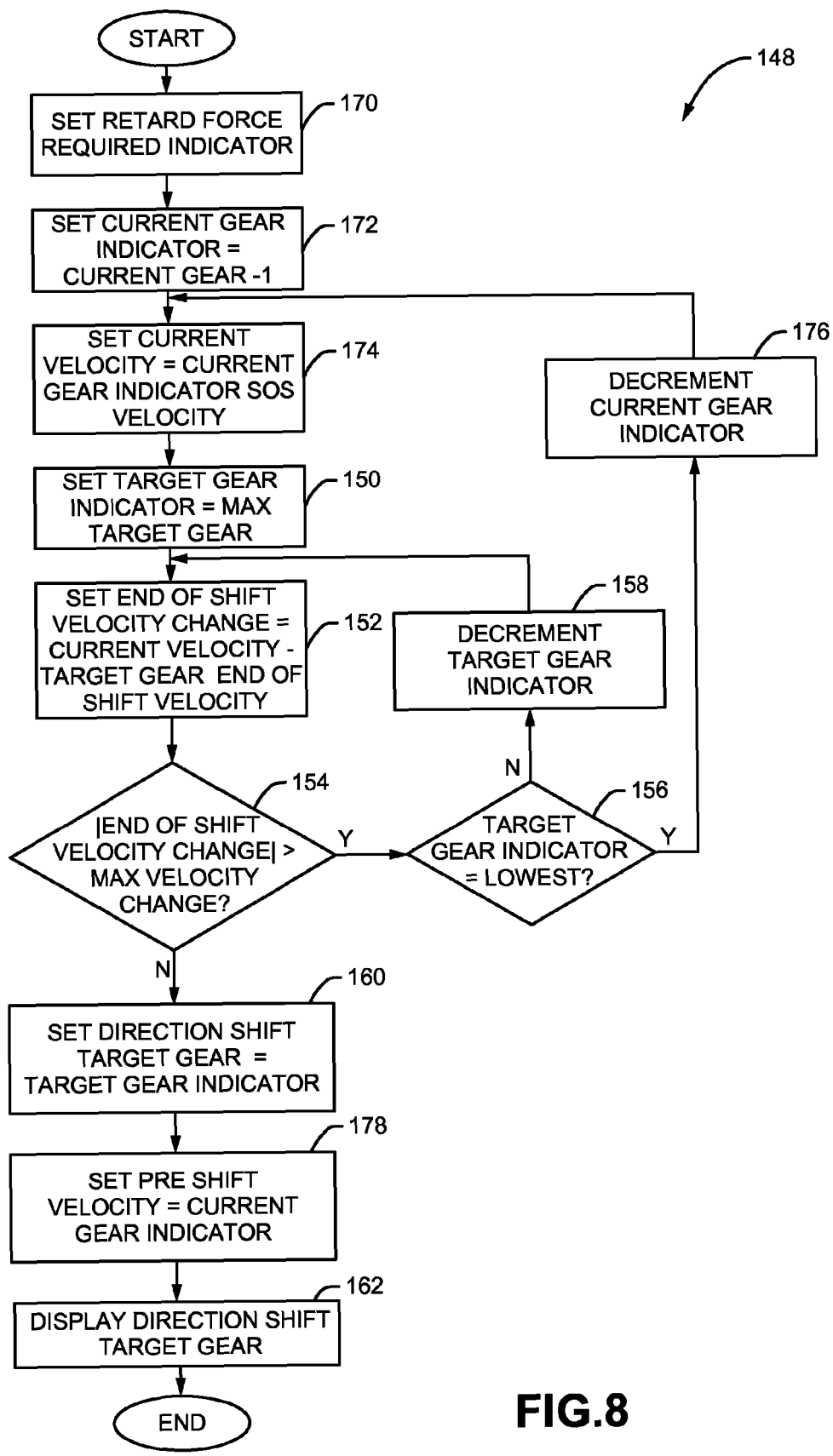
FIG. 8 is a flow diagram of an exemplary retarding force routine in accordance with the present disclosure that may be implemented in the work machine of FIG. 1.

An embodiment of the retarding force routine 148 is shown in the flow diagram of FIG. 8. The retarding force routine 148 may begin at a block 170 where the controller 100 may set a retarding force required indicator that will indicate to the controller 100 to execute the retarding force routine when a directional shift is requested. After the retarding force required indicator is set, control may pass to a block 172 where a current gear indicator may be set to the current gear minus one. In the strategy of the retarding force routine 148, the TOS velocity V is logically reduced in a similar manner to downshifting until the direction shift can be executed, and the TOS start shift velocity V in column 97 are used to provide target TOS velocities V until an end-of-shift TOS velocity change ΔV within the maximum TOS velocity change ΔV is determined. Consequently, after the current gear indicator is set at the block 172, control may pass to a block 174 to set the current TOS velocity V equal to the TOS start shift velocity V for the current gear indicator.

With the current TOS velocity V set to a value to which the TOS velocity V may be reduced prior to executing a direction shift, the retarding force routine 148 may proceed in a generally similar manner as the machine velocity change gear selection routine 140 to determine the appropriate direction shift target gear after the TOS velocity V is reduced. The logic of blocks 150, 152, 154, 156, 158 of the routine 140 may be incorporated in a similar manner in the routine 148 to iteratively determine the appropriate direction shift target gear after the speed reduction. The blocks 150, 152, 154, 156, 158 execute in a similar manner as described above. However, the block 156 is modified so that when the absolute value of the end-of-shift TOS velocity change ΔV is less than the maximum TOS velocity change ΔV at the block 154 and the target gear indicator is set to the lowest gear in the shift direction at the block 156, control may pass to a block 176 to decrement the current gear indicator to the next lowest gear in the current direction to simulate a lower downshift prior to shifting to the target gear. After the target gear indicator is decremented, control may pass back to the block 174 to set the current TOS velocity V to the TOS start shift velocity V for the lower gear and determine if the direction shift may be executed at that velocity.

Once the combination of the TOS start shift velocity V for a lower gear and the TOS end shift velocity V for the target gear indicator result in an end-of-shift TOS velocity change $\Delta V$ that is within the maximum TOS velocity change $\Delta V$ at the block 154, control may pass to the block 160 to set the direction shift target gear equal to the target gear indicator. Control may then pass to a block 178 to set a pre-shift TOS velocity V equal to TOS start shift velocity V for the lower gear. The pre-shift TOS velocity V may be subsequently used by the controller 100 to indicate the TOS velocity V to which the speed of the work machine 10 must be reduced prior to shifting to the target gear in a retarding force situation as will be discussed further hereinafter. Control of the retarding force routine 148 may then pass to the block 162 for display of the direction shift target gear before terminating.

Figure 9:
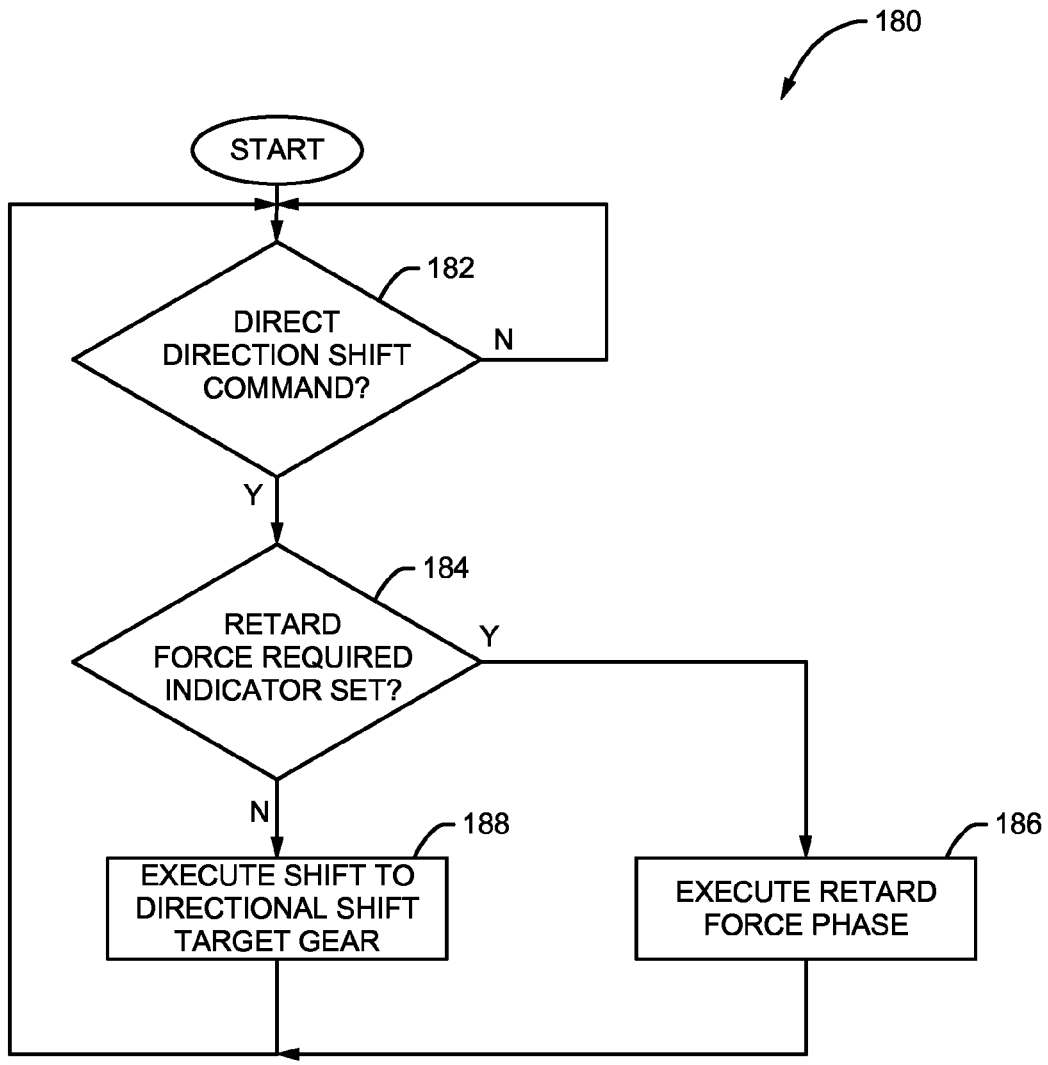
FIG. 9 is a flow diagram of an exemplary directional shift execution routine in accordance with the present disclosure that may be implemented in the work machine of FIG. 1.

With the target gear indicator and the retarding force required indicator set by the machine velocity change gear selection routine 140 and the retarding force routine 148, the controller 100 may be prepared to execute a directional shift execution routine such as the routine 180 shown in the flow diagram of FIG. 9. The directional shift execution routine 180 may begin at a block 182 where the controller 100 may determine if a directional shift command has been input by the operator at the input direction control 112. The controller 100 may continuously evaluate the value of the direction control signal from the input direction control 112 and detect when the value changes from the current travel direction of the work machine 10 to the opposite direction. As long as no directional shift command is detected, control may return to the block 182 to continue evaluating the direction control signal.

When the controller 100 detects a change in the value of the direction control signal caused by operator input at the input direction control 112, control may pass to a block 184 where the controller 100 checks the retarding force required indicator to determine whether the requested directional shift can be executed under the current operating conditions. If the retarding force required indicator was set at the block 170 of the routine 148 to a value indicating that a retarding force is required, control may pass to a block 186 where the controller 100 may execute a retarding force phase of the directional shift execution routine 180. As discussed above, the conditions for setting the retarding force required indicator require the current TOS velocity V of the work machine 10 to be reduced to the pre-shift TOS velocity V before a directional shift is executed to avoid exceeding the maximum TOS velocity change $\Delta V$ and overheating the transmission oil.

Application of the retarding force and the corresponding deceleration of the work machine 10 may be accomplished with any appropriate retarding device. For example, in a similar manner as shown in the table 60 of FIG. 2, the power source 26 and the transmission 30 may function as the retarding device by downshifting to a lower gear in the current direction of travel. The controller 100 may transmit control signals to the transmission clutch actuator(s) 126 to operate the clutches to affect the downshift to the lower gear. The change in the gear ratio due to the downshift will cause engine braking to reduce the speed of the work machine 10. In alternative embodiments, the controller 100 may engage the brakes of the work machine 10 via the brake actuator(s) 128 to reduce the speed of the work machine 10 and, correspondingly the TOS speed V. In other embodiments, the retarding device actuator(s) 130 may be actuated as an alternative or in addition to downshifting and braking to engage other types of retarding devices, such as flywheels, hydraulic fans, electric generators, other clutching mechanisms and the like that will place additional loading on the power source 26 and the transmission 30 and reduce the output torque to the wheels 22, 24. The net effect of applying the retarding force and slowing the work machine 10 is to distribute the energy required to reverse the direction of the work machine 10 across multiple components of the work machine 10, and to not solely rely on the clutches in the transmission 30 to supply the energy.

As the retarding force is applied to slow the work machine 10, the controller 100 may continue to operate within the retarding force phase to monitor the speed sensor signals received from the engine speed sensor 116. When the controller 100 determines that the TOS velocity V is reduced to the pre-shift TOS velocity V so that the directional shift that will not result in a TOS speed V in the opposite direction that exceeds the maximum TOS velocity change $\Delta V$, the controller 100 transmits control signals to the transmission clutch actuator(s) 126 to affect the directional shift to an appropriate gear in the target direction. When the retarding force phase and the directional shift are completed at the block 186, control may pass back to the block 182 to wait for the next directional shift command from the operator.

If the retarding force required indicator was not set in the machine velocity change gear selection routine 140 as determined at the block 184, the directional shift may be executed without first slowing the work machine 10. Under those conditions, control may pass to a block 188 where the controller 100 transmits control signals to the transmission clutch actuator(s) 126 to affect the directional shift to the directional shift target gear determined in the routine 140 and set at the block 160. After the directional shift is completed at the block 186, control may pass back to the block 182 to wait for the next directional shift command from the operator.

A similar gear shift strategy may be employed when the operator commands an upshift or a downshift to ensure that the end-of-shift TOS velocity change $\Delta V$ is less than the maximum TOS velocity change $\Delta V$ and the input energy in the gear shift does not compromise the transmission clutches. The operator may command the upshift or downshift by manipulating the input gear control 114 to the upshift or downshift position. The number of actuations of the input gear control 114 will be interpreted by the controller 100 as the increase or decrease from the present gear. Consequently, two actuations to the upshift position correspond to a two gear upshift request, such as to shift from 2F to 4F. Three actuations to the downshift position may correspond to a three gear downshift request from 6R to 3R. As with direction shift requests, upshift and downshift requests may be evaluated to ensure the maximum input energy is not exceeded.

Figure 10:
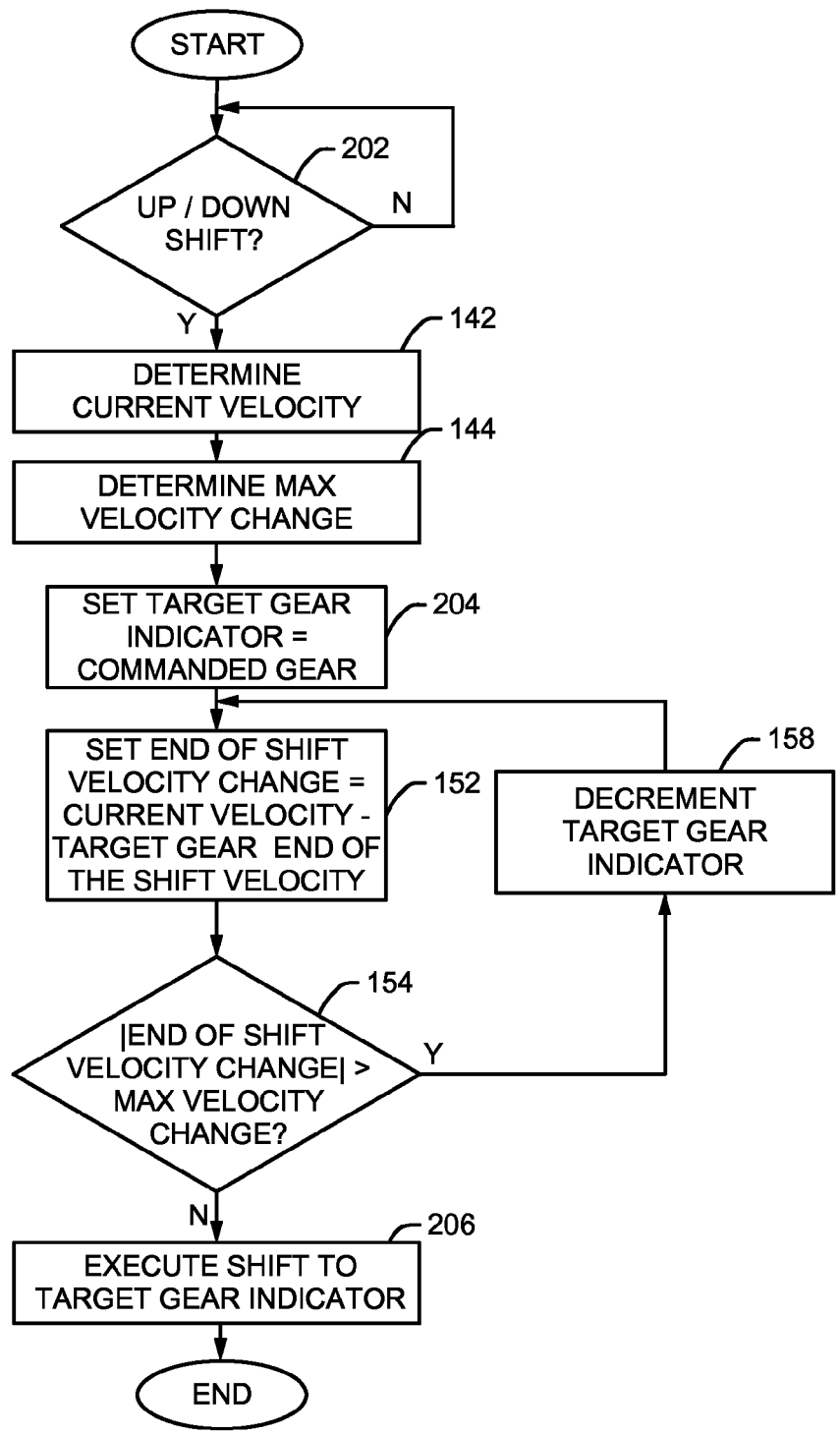
FIG. 10 is a flow diagram of an exemplary upshift/downshift execution routine in accordance with the present disclosure that may be implemented in the work machine of FIG. 1.

FIG. 10 illustrates an exemplary upshift and downshift execution routine 200 based on similar principles as the routines 140, 148, 180. The routine 200 may begin at a block 202 where the controller 100 monitors for gear upshift and downshift commands to be transmitted from the input gear control 114. If the controller 100 does not detect commands from the input gear control 114, it may continue monitoring for the command signals. If the controller 100 detects upshift or downshift commands at the block 202, control may pass to blocks 142, 144 to determine the current TOS velocity V and the maximum TOS velocity change ΔV, respectively, in a similar manner as discussed above for the blocks 142, 144.

After, prior to, or contemporaneously with, determining the current TOS velocity V and the maximum TOS velocity change ΔV, control may pass to a block 204 where the controller 100 may set the target gear indicator equal to the gear commanded by the operator. The controller 100 may tally the number of upshift or downshift commands transmitted from the input gear control 114 within a predetermined period of time after a first shift command is detected, such as by incrementing a gear command counter. The commanded gear may be determined by adding (for upshift commands) or subtracting (for downshift commands) the tallied number of shift commands to/from the current gear, and the target gear indicator may be set equal to the commanded gear.

After the target gear indicator is set, control may pass to blocks 152, 154, 158 to determine the target gear through a similar iterative process as discussed above. The end-of-shift TOS velocity change ΔV is calculated at the block 152 by subtracting the TOS end of shift velocity V for the target gear indicator from the current TOS velocity V, and the absolute value is compared to the maximum TOS velocity change ΔV at the block 154. The target gear indicator is decremented at the block 158 and the logic at blocks 152, 154 is re-executed if the absolute value of the end-of-shift TOS velocity change ΔV is greater than the maximum TOS velocity change ΔV. If the if the absolute value of the end-of-shift TOS velocity change ΔV is less than the maximum TOS velocity change ΔV at the block 154, control may pass to a block 206 to execute the upshift or the downshift to the gear of the target gear indicator at the transmission 30.

The strategy outlined herein is also applicable in rolling neutral-to-gear shifts where the transmission 30 is in neutral but the work machine 10 is moving. The operator may input upshift or downshift commands at the input gear control 114 when the transmission 30 is in neutral. The target gear selection logic utilizes the current TOS velocity V instead of the current gear of the transmission 30, so the proposed shift may be evaluated even though the transmission 30 is in neutral. Consequently, an appropriate target gear may be determined starting at the rolling neutral transmission condition in direction shifts, upshifts and downshifts.

INDUSTRIAL APPLICABILITY

The gear selection and execution routines 140, 148, 180, 200 may be effective in limiting clutch temperatures within the transmission 30 on high speed shifts, which correspondingly may mitigate degradation and premature failure of the transmission clutches. The machine velocity change shift strategy determines acceptable TOS velocity changes ΔV that require less energy to execute the directional shift and reverse the direction of travel of the work machine 10 so that the oil temperature $T_O$ within the transmission 30 will not reach levels that compromise the clutch glue or otherwise adversely affect the components of the transmission 30. The machine velocity change shift strategy factors in changes in the grade of the work surface 40, the mass of the work machine 10 and the temperature of the transmission oil to adjust the energy required for the directional shift and the acceptable TOS velocity change ΔV that can vary with these parameters.

Referring back to the table 60 in FIG. 2, the shift control logic expressed therein is static with respect to the grade, mass and oil temperature in previous strategies. In the strategy in accordance with the present disclosure, the cutoffs for the TOS velocity V in the TOS velocity column 64 may be updated based on the real-time conditions and values of the grade, mass and oil temperature. When the work machine 10 is travelling down grade, the maximum TOS velocity change ΔV from Eqs. (1)-(3) will be reduced for a directional shift sending the work machine 10 back uphill. In the table 60, the directional shift from 4F may have the TOS velocity V limits shortened such that the cutoff for shifting to 2R may be reduced to 500 rpm, for example, the cutoff for shifting to 1R may adjust downward to a range from 500 rpm to 1,250 rpm, and a downshift to 3F before reversing to 1R may occur at TOS velocities V greater than 1,250 rpm. Conversely, the limiting TOS velocities V may be extended when the work machine 10 will switch from traveling uphill to moving downhill, with shifts to 2R occurring at TOS velocities V up to 1,100 rpm, to 1R occurring at TOS velocities V in the range of 1,100 rpm to 1,850 rpm, and with initial downshifting not required until the TOS velocity V exceeds 1,850 rpm. Those skilled in the art will understand that similar adjustments to the limiting TOS velocities V will occur for variations in the mass of the work machine 10 and the oil temperature.

Real time conditions may be taken into consideration in a similar manner when no direction change commands are detected, but the commanded speed at the input speed control 110 changes. A TOS velocity V to which the work machine 10 may accelerate may increase and allow for a higher target gear when the work machine 10 is travelling downgrade, is lighter, or has a lower oil temperature. In contrast, the TOS velocity change ΔV for acceleration may decrease when the work machine 10 is travelling upgrade, is heavier or has a higher oil temperature. The real time conditions have similar effects on the maximum TOS velocity change ΔV for deceleration of the work machine 10 as will be understood by those skilled in the art and is contemplated by the inventors.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A method for machine velocity change gear selection in a work machine having a power source and a transmission configured to be shifted to a plurality of first gears for causing the work machine to move in a first direction due to power from the power source, and to be shifted to a plurality of second gears for causing the work machine to move in a second direction opposite the first direction due to the power from the power source, wherein each of the plurality of first gears and the plurality of second gears has a corresponding end of shift velocity of the work machine when the transmission is shifted into the one of the plurality of first gears or one of the plurality of second gears, the method comprising:
- determining at a controller of the work machine a current velocity of the work machine moving in the first direction based on information transmitted in a speed sensor signal from a speed sensor of the work machine;
- determining at the controller a maximum velocity change for the work machine from the current velocity, wherein the maximum velocity change is determined based on a maximum amount of energy that may be expended by components of the transmission to change a velocity of the work machine without increasing a current temperature of a relevant component of the transmission above a clutch limit temperature above which the transmission may experience a failure mode;
- selecting at the controller a machine velocity change target gear from the plurality of first gears and the plurality of second gears that has the greatest difference between the current velocity of the work machine and the end of shift velocity of the selected one of the plurality of first gears or one of the plurality of second gears that is not greater than the maximum velocity change;
- detecting at the controller a directional shift command input by an operator at an input direction control of the work machine; and
- causing the transmission to execute a shift to the machine velocity change target gear in response to detecting the direction shift command at the controller.

2. The method for machine velocity change gear selection of claim 1, wherein the current velocity, the maximum velocity change and the end of shift velocity have units of revolutions per minute for a transmission output of the transmission.

3. The method for machine velocity change gear selection of claim 1, comprising:
- detecting at the controller actuation of an input gear control of the work machine with a command to one of upshift and downshift from a current one of the plurality of first gears; and
- determining the current velocity of the work machine based on a sensed velocity of the work machine in response to detecting actuation of the input gear control.

4. The method for machine velocity change gear selection of claim 1, wherein determining the maximum velocity change for the work machine comprises:
- determining at the controller a percent grade of a work surface over which the work machine is moving in the first direction based on information transmitted in a grade sensor signal from a grace sensor of the work machine; and
- determining the maximum velocity change based on the maximum amount of energy, wherein the maximum velocity change decreases when the percent grade of the work surface causes the work machine to move downhill in the first direction and uphill in the second direction.

5. The method for machine velocity change gear selection of claim 4, wherein the maximum velocity change increases when the percent grade of the work surface causes the work machine to move uphill in the first direction and downhill in the second direction.

6. The method for machine velocity change gear selection of claim 1, wherein determining the maximum velocity change for the work machine comprises:
- determining at the controller a percent grade of the work surface over which the work machine is moving in the first direction; and
- retrieving at the controller the corresponding maximum velocity change for the percent grade of the work surface from a table of data stored at a memory of the controller, wherein the table of data contains machine velocity change limits having a plurality of stored percent grades of a work surface over which the work machine is moving and, for each of the plurality of stored percent grades, corresponding maximum velocity changes for directional shifts from the first direction to the second direction, and from the second direction to the first direction, wherein the corresponding maximum velocity changes are previously determined based on the maximum amount of energy and the plurality of stored percent grades.

7. The method for machine velocity change gear selection of claim 1, wherein determining the maximum velocity change for the work machine comprises:
- determining at the controller a mass of the work machine; and
- determining the maximum velocity change based on the maximum amount of energy, wherein the maximum velocity change decreases when the mass of the work machine increases and the maximum velocity change increases when the mass of the work machine decreases.

8. The method for machine velocity change gear selection of claim 1, wherein determining the maximum velocity change for the work machine comprises:
- determining at the controller a current oil temperature of oil within a drive train component; and
- determining the maximum velocity change based on the maximum amount of energy, wherein the maximum velocity change decreases when the current oil temperature increases and the maximum velocity change increases when the current oil temperature decreases.

9. A work machine, comprising:
- a power source;
- a transmission operatively connected to the power source, the transmission configured to be shifted to a plurality of first gears for causing the work machine to move in a first direction due to power from the power source, and to be shifted to a plurality of second gears for causing the work machine to move in a second direction opposite the first direction due to the power from the power source, wherein each of the plurality of first gears and the plurality of second gears has a corresponding end of shift velocity of the work machine when the transmission is shifted into the one of the plurality of first gears of one of the plurality of second gears;
- a speed sensor operatively connected to one of the power source and the transmission, the speed sensor transmitting a speed sensor signal with a speed value;
- a controller operatively connected to the speed sensor, wherein:
  the controller is programmed to determine a current velocity of the work machine in the first direction based on the speed value of the speed sensor signal, the controller is programmed to determine a maximum velocity change for changing a velocity of the work machine from the current velocity, wherein the maximum velocity change is determined based on a maximum amount of energy that may be dissipated by components of the transmission to change the velocity of the work machine without increasing a current temperature of a relevant component of the transmission above a clutch limit temperature above which the transmission may experience a failure mode, and the controller is programmed to select a target gear from the plurality of first gears and the plurality of second gears that has the greatest difference between the current velocity of the work machine and the end of shift velocity of the selected one of the plurality of first gears or one of the plurality of second gears that is not greater than the maximum velocity change.

10. The work machine of claim 9, wherein the current velocity, the maximum velocity change and the end of shift velocity have units of revolutions per minute for a transmission output of the transmission.

11. The work machine of claim 9, comprising an input gear control operatively connected to the controller and transmitting gear upshift commands and gear downshift commands in response to actuation by an operator of the work machine, wherein the controller is programmed to detect the gear upshift commands and the gear downshift commands, and wherein the controller is programmed to determine the current velocity of the work machine based on the speed value in response to detecting the gear upshift commands and the gear downshift commands.

12. The work machine of claim 9, comprising a grade sensor operatively connected to the controller, sensing a percent grade of a work surface over which the work machine is moving in the first direction, and outputting a grade sensor signal with a percent grade value, wherein the controller is programmed to determine the maximum velocity change based on the maximum amount of energy, and wherein the maximum velocity change decreases when the percent grade value of the grade sensor signal indicates that the work machine moves downhill in the first direction and uphill in the second direction.

13. The work machine of claim 12, wherein the maximum velocity change increases when the percent grade value of the grade sensor signal indicates that the work machine moves uphill in the first direction and downhill in the second direction.

14. The work machine of claim 9, comprising a grade sensor operatively connected to the controller, sensing a percent grade of a work surface over which the work machine is moving the first direction, and outputting a grade sensor signal with a percent grade value, wherein the controller comprises a memory having a table of data stored therein for machine velocity change limits having a plurality of stored percent grades of the work surface over which the work machine is moving and, for each of the plurality of stored percent grades, corresponding maximum velocity changes for directional shifts from the first direction to the second direction, and from the second direction to the first direction, wherein the corresponding maximum velocity changes are previously determined based on the maximum amount of energy and the plurality of stored percent grades, wherein the controller is programmed to determine the percent grade of the work surface based on the percent grade value from the grade sensor signal, and the controller is programmed to retrieve from the table of data the corresponding maximum velocity change for the percent grade of the work surface.

15. The work machine of claim 9, comprising a load sensor operatively connected to the controller, sensing a load parameter from which a mass of the work machine may be derive, and outputting a load sensor signal with a load parameter value, wherein the controller is programmed to determine the mass of the work machine based on the load parameter value in the load sensor signal, and wherein the controller is programmed to determine the maximum velocity change based on the maximum amount of energy, wherein the maximum velocity change decreases when the mass of the work machine increases and the maximum velocity change increases when the mass of the work machine decreases.

16. The work machine of claim 9, comprising an oil temperature sensor operatively connected to the controller, sensing an oil temperature of oil within a transmission housing of the transmission, and outputting an oil temperature sensor signal with an oil temperature value, wherein the controller is programmed to determine a current oil temperature of oil within the transmission housing based on the oil temperature value in the oil temperature sensor signal, and wherein the controller is programmed to determine the maximum velocity change based on the maximum amount of energy, wherein the maximum velocity change decreases when the current oil temperature increases and the maximum velocity change increases when the current oil temperature decreases.

17. A method for directional shift gear selection in a work machine having a power source and a transmission configured to be shifted to a plurality of first gears for causing the work machine to move in a first direction due to power from the power source, and to be shifted to a plurality of second gears for causing the work machine to move in a second direction opposite the first direction due to the power from the power source, wherein each of the plurality of first gears and the plurality of second gears has a corresponding end of shift velocity of the work machine when the transmission is shifted into the one of the plurality of first gears or one of the plurality of second gears, the method comprising:

determining at a controller of the work machine a current velocity of the work machine moving in the first direction based on information transmitted in a speed sensor signal from a speed sensor of the work machines;

determining at the controller a percent grade of a work surface over which the work machine is moving the first direction based on information transmitted in a grade sensor signal from a grade sensor of the work machines;

determining at the controller a maximum velocity change for reversing movement of the work machine from the first direction to the second direction, wherein the maximum velocity change is determined based on a maximum amount of energy that may be expended to reverse the work machine from the first direction to the second direction without increasing a current temperature of a relevant component of the transmission above a clutch limit temperature above which the transmission may experience a failure mode, and wherein the maximum velocity change decreases when the percent grade of the work surface causes the work machine to move downhill in the first direction and uphill in the second direction and the maximum velocity change increases when the percent grade of the work surface causes the work machine to move uphill in the first direction and downhill in the second direction;

selecting at the controller a directional shift target gear from the plurality of second gears that has the greatest difference between the current velocity in the first direction and the end of shift velocity of the selected one of the plurality of second gears in the second direction that is not greater than the maximum velocity change;

detecting at the controller a directional shift command input by an operator at an input direction control of the work machine; and causing the transmission to execute a shift to the directional shift target gear in response to detecting the direction shift command at the controller.

18. The method for directional shift gear selection of claim 17, wherein determining the maximum velocity change for the work machine comprises:

retrieving at the controller the corresponding maximum velocity change for the percent grade of the work surface from a table of data stored at a memory of the controller, wherein the table of data contains machine velocity change limits having a plurality of stored percent grades of a work surface over which the work machine is moving and, for each of the plurality of stored percent grades, corresponding maximum velocity changes for directional shifts from the first direction to the second direction, and from the second direction to the first direction, wherein the corresponding maximum velocity changes are previously determined based on the maximum amount of energy and the plurality of stored percent grades.

19. The method for directional shift gear selection of claim 17, wherein selecting the directional shift target gear comprises:

setting at the controller a target gear indicator equal to a maximum second gear of the plurality of second gears;

calculating at the controller an end of shift velocity change for the one of the plurality of second gears in the target gear indicator that is equal to the current velocity minus the end of shift velocity for the second gear of the plurality of second gears indicated by the target gear indicator;

comparing at the controller the maximum velocity change to the end of shift velocity change; and setting the target gear indicator equal to a next lowest one of the plurality of second gears and re-executing the calculating and comparing steps in response to determining that the end of shift velocity change is greater than the maximum velocity change.

20. The method for directional shift gear selection of claim 19, wherein selecting the directional shift target gear comprises setting a directional shift target gear indicator equal to the target gear indicator in response to determining that the end of shift velocity change is less than the maximum velocity change.

* * * * *